118,523

UNITED STATES PATENT OFFICE.

WILLIAM GARTON, OF SOUTHAMPTON, ENGLAND.

IMPROVEMENT IN THE PREPARATION OF FERMENTABLE SACCHARINE MATTERS.

Specification forming part of Letters Patent No. 118,523, dated August 29, 1871.

*To all whom it may concern:*

Be it known that I, WILLIAM GARTON, of Southampton, England, brewer, have invented or discovered certain new and useful Improvements in the Preparation of Fermentable Saccharine Matters; and I do hereby declare that the following is a full, clear, and exact description thereof—that is to say:

The invention relates to the treatment of sugar and other saccharine matters to be used for the purpose of preparing fermented liquors.

In preparing saccharine matters, whether from sugar or from amylaceous substances, it is usual to treat the sugar or other substances with an acid, in order to convert it into lævo-glucose or dextro-glucose, which is more suitable for the purpose of fermentation; and after this conversion it is usual to neutralize the acid with chalk, lime, or other suitable substances.

My invention refers to that stage of the process in which acid is present in the saccharine solution in a free state; and consists in adding to the solution, either during the conversion or after the conversion is completed, some finely-ground animal charcoal or other substance containing phosphate of lime. The effect of this addition is that the free acid acts upon the charcoal and renders the phosphates therein soluble, so that, when the acid is neutralized, these phosphates are reprecipitated in a finely-divided condition; and when the precipitate subsides or the solution is filtered a better defecation or purification of the saccharine matters is produced.

Without limiting myself to any particular proportions, I may state that from two to ten per cent. of phosphate of lime in proportion to the sugar will generally answer well, the amount of phosphate varying according to the quantity of acid employed and to the amount of nitrogenous matters and other impurities present. Even twenty per cent. of phosphate may be used with advantage when there is a large quantity of impurities.

What I claim, and desire to secure by Letters Patent, is—

The employment of animal charcoal or other substance containing phosphate of lime, as and for the purpose herein set forth.

In witness whereof I, the said WILLIAM GARTON, have hereunto set my hand this 20th day of June, 1871.

WM. GARTON.

Witnesses:
W. THURSTON WAITE, *Southampton.*
I. F. LITTLETON, *Southampton.*